April 14, 1964 T. P. AVERY 3,129,022
COUPLING
Filed Dec. 20, 1960

INVENTOR
Theodore P. Avery
BY Mason, Fenwick & Lawrence
ATTORNEYS

United States Patent Office 3,129,022
Patented Apr. 14, 1964

3,129,022
COUPLING
Theodore P. Avery, 44 Seneca St., Oil City, Pa.
Filed Dec. 20, 1960, Ser. No. 77,044
5 Claims. (Cl. 285—249)

This invention relates to hose and coupling assemblies, and particularly to such assemblies having flexible hose lines used to carry liquid materials which will leak around ordinary screw-type fittings.

In order to obtain a leaf-proof connection between a hose line and a member to which it is to be connected, it is usually necessary to provide the hose with an end member which will form one-half of a ground joint, or to use one or more ring-type washers, or both. Ground joints are expensive to provide, and if the sections are not properly positioned relative to one another they will leak. Washers are hard to keep in place and frequently get lost in handling and are not available when it is desired to connect the hose.

The general object of the present invention is to provide a hose having a coupling thereon which will be self-seating and self-sealing when the connection is made and will need no other sealing means.

A more specific object of the invention is to provide a hose and coupling which utilizes the end of the hose as the primary sealing member.

Another object is the provision of a hose and coupling of this type which employs an endwise resilient hose with the hose under endwise pressure when the coupling is engaged to maintain a resilient pressure seal.

A further object is to provide a structure of this nature wherein the hose will exert sealing pressure at the joint and a secondary seal will be maintained exteriorly of the hose end seal.

Still another object is to provide a hose and coupling which will be extremely simple to manufacture and use, which will withstand long and hard usage, and maintain its seal after repeated couplings and uncouplings.

Other objects of the invention will become apparent from the following description of one practical embodiment thereof, when taken in conjunction with the drawings, which accompany, and form part of, this specification.

In general, the invention comprises a hose line of a resilient material with a coupling on at least one end, so disposed that the hose end will be exposed and held in pressure contact with a fitting and the longitudinal resiliency of the hose will maintain a leak-proof seal.

Figure 1:
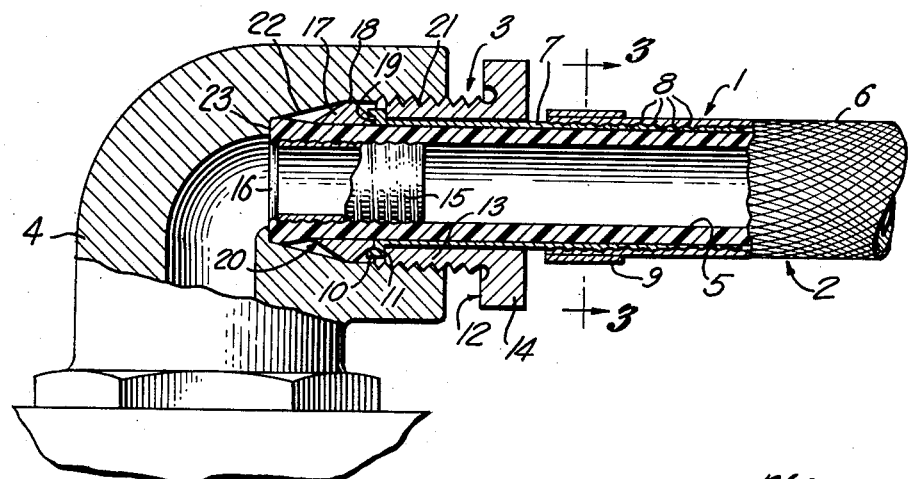
FIGURE 1 is a longitudinal section through one end of a hose and coupling embodying the principles of the present invention, shown connected to a fitting, with parts of the hose and fitting being shown in elevation.
Figure 2:
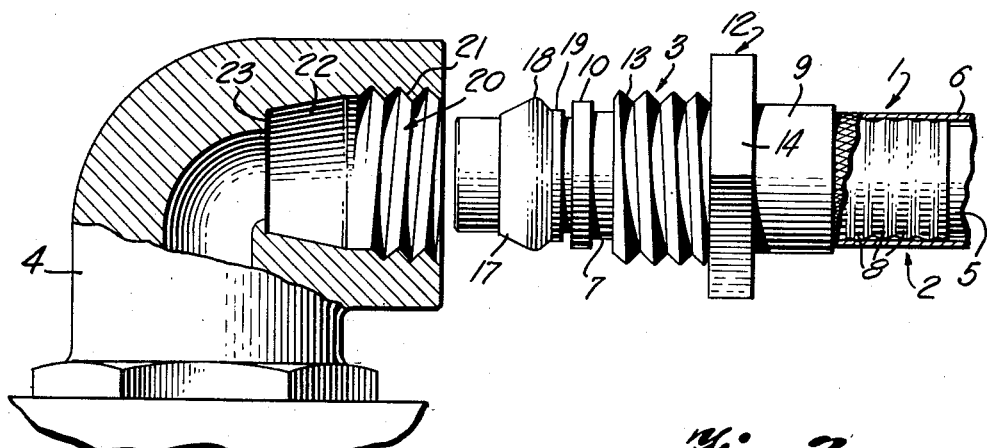
FIGURE 2 is an elevational view of the same structure with the hose line disengaged from the fitting and with parts of both elements shown in section.
Figure 3:
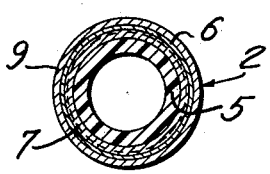
FIGURE 3 is a transverse section through the hose line, taken on the line 3—3 of FIGURE 1.

Referring to the drawings in detail, and first referring to that form of the invention shown in FIGURES 1 to 3, there is shown one end of a hose and coupling assembly 1 which includes a hose 2 having a coupling assembly 3 on its end. The hose end is illustrated in conjunction with a conventional fitting 4 to which it may be connected.

The hose 2 includes an inner tubular member 5 made of a material which is resilient and has a strong return characteristic when compressed. This will provide a hose which will be spring-like, and when compressed longitudinally will exert strong pressure to return to its uncompressed condition. Teflon has been found to be quite satisfactory for this purpose. The hose will be formed as a tube of uniform diameter and wall thickness throughout. The tube will be covered with a braided cover, or harness, 6 within which the hose is freely slidable, as will be described. It will be understood that the opposite end of the hose will have another coupling or the cover will be attached to the tube.

The coupling assembly is composed of a number of elements. One of these is a pressure sleeve 7, which is slidably mounted on the tubular hose member 5 and has one end inserted within the braided hose cover 6. This end of the pressure sleeve has annular flutes 8 so that a clamping collar 9 about the end of the braided cover will affix the cover to the sleeve and there will be no danger of the cover slipping off of the sleeve. With this arrangement, the sleeve and cover will be free to slide over the tubular hose member 5. The opposite end of the pressure sleeve has an enlarged head 10 which has an annular seat 11 in its exposed face.

Mounted upon the smooth section of the pressure sleeve, between the enlarged head 10 and the collar 9, is a take-up nut 12. The nut has an elongated, threaded body 13 and a nut head 14 by means of which it may be rotated. The nut is freely slidable on the sleeve, and is of less length than the length of the pressure sleeve between the enlarged head and the collar so that it may move longitudinally of the sleeve.

A short length of annularly ribbed tubing 15 is pressure inserted into the open end of the tubular hose member 5 to form a shape-retaining sleeve to hold the hose end against inward collapse under pressure. This sleeve is pressed far enough into the hose to leave a short length 16 of the hose end unsupported.

A ferrule 17 is fixedly secured about the hose end a relatively short distance from the end of the hose. The ferrule surrounds the hose in the area supported by the shape-retaining sleeve 15, and the tubular hose member is clamped between them. The ferrule is an annular member, tapered in both directions from a midpoint to resemble two frusto-conical elements joined base to base. The high point 18 of the annulus is slightly rounded longitudinally of the ferrule, and forms a secondary sealing member, as will be explained. The ferrule terminates in a short skirt 19 which extends rearwardly, away from the hose end, and is adapted to enter the seat 11 in the enlarged head of the pressure sleeve to hold the pressure sleeve, ferrule and tubular hose member in concentric relation when coupled to a fitting.

The fitting to which the hose is to be coupled is a conventional one, and is shown as having a central orifice 20 which is threaded adjacent its outer end 21. The orifice contains a tapered section 22 which converges inwardly to an annular face 23. The orifice is of reduced diameter from the face 23.

It is to be noted from FIGURE 2 that the length of the tubular hose member 5 relative to the braided cover with its pressure sleeve connector is great enough so that the tube end will project beyond the end of the pressure sleeve a considerable distance, and the ferrule 17 will be spaced from the enlarged head of the pressure sleeve. In many instances the separation between the ferrule and pressure sleeve end will be considerably greater than shown. The short coupling has been shown for convenience to enable a larger scale illustration of the coupling parts.

In connecting the hose to a fitting, the end is inserted into the fitting orifice until the end of the tubular hose member seats against the annular face 23 of the fitting. The nut 12 will then be moved forward into contact with the enlarged head 10 of the pressure sleeve. Further forward movement of the nut will carry the pressure sleeve with it and consequently cause some compression of the tubular hose member throughout its length. When the enlarged head of the pressure sleeve has surrounded and seated the skirt 19 of the ferrule 17 compression of the full tube length will be completed, and further movement will concentrate compression on the end of the hose tube projecting beyond the ferrule. By this time, the nut has been engaged in the threaded end of the fitting orifice and continued tightening is effected by turning the nut. Tightening the nut can continue until the ferrule seats firmly against the tapered wall 22 of the fitting. The tube end will now be under considerable pressure and will create a liquid-tight seal against the fitting face 23. The pressure will be sufficient to deform and spread the tube end.

It will be evident that the compressed tube end will form an effective seal, as the characteristic of the material to return to its uncompressed condition will hold the tube end tightly against the seat. The fact that the entire tube is under some compression will augment the pressure contact of the tube end. The ferrule forms a secondary seal, and at the same time, will hold the tube end and the entire coupling assembly in concentric relation. The yielding compression of the tube, while effective to make the seal, will not offer great resistance to turning movement of the nut.

Figure 4:
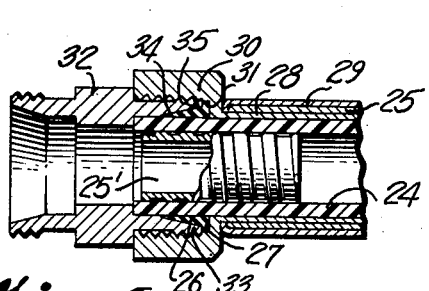
FIGURE 4 is a longitudinal section through one end of a hose and coupling of slightly modified structure.

In FIGURE 4 another form of the invention has been shown which incorporates the principles and features of the form just described, but differs from that form in some structural details.

In this embodiment, the inner tubular member 24 of the hose will be of resilient material as before, and covered with a braided cover 25. The end of the tubular hose is reinforced by a short length of tubing 25' and a ferrule 26 surrounds the hose near the end in the area supported by tubing 25'. In the modified form, the ferrule is tapered in one direction only, and this is toward the hose end. The ferrule is provided with an annular flange 27 at its back end, which serves as a secondary sealing member, as will be shown.

The pressure sleeve 28 is slidable on the inner tubular hose 24, and the braided cover is clamped between the pressure sleeve and a clamping collar 29. The pressure sleeve in this form is integral with a coupling nut 30. The nut is internally threaded, and is of larger internal diameter than the pressure sleeve forming an abutting face 31 to engage the back of the ferrule flange 27.

The above described unit is adapted for connection to a male fitting, and a nipple 32 having a threaded end 33 is shown. The nipple has an outwardly flaring orifice 34 for co-action with the tapered ferrule 26, and a flat end face 35 which is engaged by the ferrule flange 27.

When the coupling is to be connected to the nipple 32, for example, the orifice of the nipple is placed over the protruding tube end and the threaded end of the nipple engaged with the threads of the coupling nut. As the nipple is screwed into the nut, the tube will be put under lengthwise pressure and the ferrule will seat tightly on the flaring orifice in the nipple. As the nipple tightens, the ferrule flange 27 will be pressed against the end face 35 of the nipple and the abutting face 31 of the nut. Thus a double sealing is obtained with this form of the invention also.

While practical embodiments of the invention have been disclosed, it will be understood that the details of construction shown and described are merely by way of illustration and the invention may take other forms within the scope of the appended claims.

What is claimed is:

1. A hose and coupling assembly connectable to a fitting having a bore, which fitting has a threaded portion adjacent its end and the bore including an enlarged conical section terminating in an annular face at right angles to the longitudinal axis of the bore, the hose and coupling assembly comprising a tube of resilient material, a covering movably mounted on the tube having a length less than the tube and positioned relative to the tube to allow at least one end of the tube to project beyond the cover, a movable pressure sleeve connected to the cover at the end from which the tube projects slidably mounted on the tube, a take-up nut carried by the pressure sleeve and threadedly engageable with the threaded portion of the fitting, an annulus rigidly fixed about the projecting end of the tube spaced from the outer end of the tube at a distance sufficient to enable the end of the tube to engage the annular face of the bore in the fitting at least simultaneously with the engagement of the annulus with the conical section of the tube when the tube is inserted into the bore in the fitting, a shape retaining sleeve inserted within the projecting end of the tube and spaced from the outer end of the tube so that the outer end of the tube is unsupported and means on the pressure sleeve to bear against the annulus when the take-up nut is threaded into the threaded portion of the fitting to move the outer end of the tube into compressive engagement with the annular face of the fitting and to move the annulus into engagement with the enlarged conical section of the bore in the fitting.

2. A hose and coupling assembly according to claim 1, wherein the annulus is spaced from the outer end of the tube a distance sufficient to permit the outer end of the tube to engage the annular face in the bore of the fitting prior to the engagement of the annulus with the enlarged conical section of the bore in the fitting.

3. A hose and coupling assembly according to claim 1, wherein the annulus is of resilient material similar to the material of the tube.

4. A hose and coupling assembly according to claim 1, wherein the take-up nut and the pressure sleeve are integral.

5. A hose and coupling assembly according to claim 1, wherein the bearing means on the pressure sleeve has an annular seat to receive the annulus to concentrically position the annulus and tube relative to the pressure sleeve.

References Cited in the file of this patent

UNITED STATES PATENTS

| 87,993 | Weston | Mar. 16, 1869 |
| 411,829 | Nachtrieb | Oct. 1, 1889 |
| 782,552 | Glauber | Feb. 14, 1905 |
| 1,212,817 | Russel | Jan. 16, 1917 |
| 1,230,854 | Breuer | June 26, 1917 |
| 1,296,103 | Mushlberg | Mar. 4, 1919 |
| 2,159,150 | Heintz | May 23, 1939 |
| 2,211,446 | Troshkin | Aug. 13, 1940 |
| 2,226,039 | Wiltse | Dec. 24, 1940 |
| 2,470,546 | Carlson | May 17, 1949 |
| 2,516,583 | Moore | July 25, 1950 |
| 2,907,591 | Gulick | Oct. 6, 1959 |

FOREIGN PATENTS

| 460,336 | Great Britain | Jan. 26, 1937 |
| 801,859 | Great Britain | Sept. 24, 1958 |